Patented May 13, 1941

UNITED STATES PATENT OFFICE 2,241,939

LUMINESCENT MATERIAL

Günther Aschermann and Ernst Friederich, Berlin-Charlottenburg, Germany, assignors to General Electric Company, a corporation of New York No Drawing. Application October 28, 1940, Serial No. 363,212. In Germany February 4, 1939

4 Claims. (Cl. 250—81)

Our invention relates in general to luminous materials, and in particular to luminescent zinc silicate.

It is well known that manganese-activated zinc silicate will produce an intensive green luminescence when excited by ultra-violet radiations, particularly by the resonance line of mercury, i. e., 2537 A. The most efficient zinc silicate known at present converts the invisible ultra-violet radiations, particularly that of the 2537 A. line of the low-pressure mercury discharge, into visible radiations with a quantum yield of approximately 0.8. This very favorable behavior of the zinc silicates can be explained by the fact that zinc silicate is a material whose main range of excitation lies mainly in the immediate vicinity of the 2537 A. line. In the low-pressure mercury discharge this 2537 line occurs to an extraordinary extent, amounting to approximately 50 per cent of the total radiation, as a result of which the circumstance exists that the most favorable exciting radiation is produced easily and economically.

An object of our invention is to provide a luminescent zinc silicate which will convert a greater proportion of the 2537 A. mercury line into visible radiations than heretofore obtainable with such material.

Further objects and advantages of our invention will appear from the following description of species thereof.

According to the invention, it has been found that it is possible to increase considerably the conversion of the 2537 line into visible light by adding to the luminous zinc silicate, prior to the heating thereof, white sesquioxides, (in other words metal oxides of the general formula $M_2O_3$) either separately or in mixtures with each other, up to 25 per cent. For example, the oxides of metals in the third group of the periodic system, and the sesquioxides of lanthanides have been found suitable for this purpose. The above-mentioned additions can amount to as much as 25 per cent without causing a change in the color of the emitted light. Additions of $Yt_2O_3$, $La_2O_3$ or mixtures of these oxides have proved to be particularly advantageous; admixtures of $Al_2O_3$, $Sc_2O_3$, $B_2O_3$, $Yb_2O_3$ also show an improvement in the conversion factor.

It is probable that by the addition of the above-mentioned oxides, the absorption or excitation range of the luminescent material is displaced somewhat in such a way that it lies still more completely in the range of the maximum of the ultra-violet excition (occurring at 2537 angstrom units) than is the case with manganese-activated zinc silicate without the addition of sesquioxides. An accurate measurement of the absorption range, however, is very difficult, especially because the displacement caused by the addition of the above-mentioned oxides may be very small. A slight displacement, however, suffices for improving to a considerable extent the light yield of the discharge devices provided with zinc-silicate luminescent materials. For instance, it has been possible by adding oxides according to the invention to increase the light yield of luminescent zinc silicate from 120 HK/m to 135 HK/m, and this increase was obtained in luminous discharge devices which were provided with the most efficient zinc silicates heretofore known.

What we claim as new and desire to secure by Letters Patent of the United States is:

1. A luminescent material highly responsive to the 2537 A. mercury line comprising a heat-treated combination of manganese-activated zinc silicate with an addition of up to 25 per cent of at least one metallic sesquioxide of the general formula $M_2O_3$, said material having a response to the 2537 A. mercury line substantially greater than that of manganese-activated zinc silicate without the said addition.

2. A luminescent material highly responsive to the 2537 A. mercury line comprising a heat-treated combination of manganese-activated zinc silicate with an addition of up to 25 per cent of at least one of the compounds belonging to the group consisting of the sesquioxides of the metals of the third group of the periodic system, said material having a response to the 2537 A. mercury line substantially greater than that of manganese-activated zinc silicate without the said addition.

3. The method of increasing the efficiency of the response of manganese-activated zinc silicate phosphor to the 2537 A. mercury line which comprises adding to said silicate before firing up to 25% of at least one of the compounds belonging to the group consisting of the sesquioxides of the metals of the third group of the periodic system, the amount of the added compound being sufficient to cause the phosphor to have a response to the 2537 A. line materially greater than that of an otherwise similar phosphor without the added compound.

4. The method of increasing the efficiency of the response of manganese-activated zinc silicate phosphor to the 2537 A. mercury line which comprises adding to said silicate before firing up to 25% of a metallic oxide of the general formula $M_2O_3$, the amount of the added oxide being sufficient to cause the phosphor to have a response to the 2537 A. line materially greater than that of an otherwise similar phosphor without the added oxide.

GÜNTHER ASCHERMANN.
ERNST FRIEDERICH.